US011558656B2

(12) United States Patent
Rabbat et al.

(10) Patent No.: US 11,558,656 B2
(45) Date of Patent: *Jan. 17, 2023

(54) SELECTION OF A PRERECORDED MEDIA FILE FOR SUPERIMPOSING INTO A VIDEO

(71) Applicant: Snap Inc., Santa Monica, CA (US)

(72) Inventors: Richard Rabbat, Palo Alto, CA (US); Kasey Wang, Palo Alto, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/341,736

(22) Filed: Jun. 8, 2021

(65) Prior Publication Data

US 2021/0297727 A1 Sep. 23, 2021

Related U.S. Application Data

(63) Continuation of application No. 15/816,275, filed on Nov. 17, 2017, now Pat. No. 11,057,667.

(51) Int. Cl.
*H04N 21/43* (2011.01)
*H04N 21/431* (2011.01)
*H04N 21/44* (2011.01)
*H04N 21/45* (2011.01)
*H04N 5/93* (2006.01)
*H04N 21/414* (2011.01)
*H04N 21/81* (2011.01)
*H04N 9/87* (2006.01)

(52) U.S. Cl.
CPC ....... *H04N 21/4316* (2013.01); *H04N 5/9305* (2013.01); *H04N 9/8715* (2013.01); *H04N 21/41407* (2013.01); *H04N 21/44008* (2013.01); *H04N 21/44016* (2013.01); *H04N 21/4524* (2013.01); *H04N 21/812* (2013.01)

(58) Field of Classification Search
CPC .................................................... H04N 9/8715
See application file for complete search history.

(56) References Cited

U.S. PATENT DOCUMENTS 8,209,223 B2  6/2012  Fink et al.
8,656,282 B2  2/2014  Kulas
(Continued)

FOREIGN PATENT DOCUMENTS

WO  WO-2018159168 A1  9/2018

OTHER PUBLICATIONS

U.S. Appl. No. 15/816,117, filed Nov. 17, 2017, Superimposing a prerecorded media file into a video.
(Continued)

*Primary Examiner* — Daniel T Tekle
(74) *Attorney, Agent, or Firm* — Schwegman Lundberg & Woessner, P.A.

(57) ABSTRACT

In a method for selecting of a prerecorded media file for superimposing into a video, a video of a scene is displayed on a display device of a mobile electronic device. A location of the scene is determined. A prerecorded video file is selected based at least in part on the location. The prerecorded video file is superimposed over the video, such that the video is partially obscured by the prerecorded video file. The prerecorded video file is played while displaying the video, such that the prerecorded video file and a non-obscured portion of the video are rendered simultaneously.

20 Claims, 16 Drawing Sheets

(56) References Cited

U.S. PATENT DOCUMENTS

| | | | |
|---|---|---|---|
| 8,681,178 B1* | 3/2014 | Tseng | G06T 19/006 345/629 |
| 9,148,643 B2 | 9/2015 | Walker et al. | |
| 9,349,414 B1 | 5/2016 | Furment et al. | |
| 9,652,896 B1 | 5/2017 | Jurgensen et al. | |
| 9,984,499 B1 | 5/2018 | Jurgensen et al. | |
| 10,008,240 B2 | 6/2018 | Koide et al. | |
| 10,945,042 B2 | 3/2021 | Rabbat et al. | |
| 10,958,955 B1 | 3/2021 | Kumar | |
| 11,057,601 B2 | 7/2021 | Rabbat et al. | |
| 11,057,667 B2 | 7/2021 | Rabbat et al. | |
| 2010/0257252 A1 | 10/2010 | Dougherty et al. | |
| 2012/0308192 A1 | 12/2012 | Chung et al. | |
| 2014/0245335 A1* | 8/2014 | Holden | H04N 21/44218 725/12 |
| 2015/0261003 A1* | 9/2015 | Morifuji | H04N 13/344 345/8 |
| 2017/0236331 A1* | 8/2017 | Bryson | G06T 19/006 345/633 |
| 2018/0061072 A1 | 3/2018 | Benezra et al. | |
| 2018/0190324 A1 | 7/2018 | Paul et al. | |
| 2018/0352172 A1 | 12/2018 | Hansbrough et al. | |
| 2019/0015891 A1 | 5/2019 | Rabbat et al. | |
| 2019/0158797 A1 | 5/2019 | Rabbat et al. | |
| 2020/0068132 A1 | 2/2020 | Lin et al. | |
| 2020/0082549 A1 | 3/2020 | Dehghan et al. | |
| 2020/0162792 A1 | 5/2020 | Rabbat et al. | |
| 2021/0117691 A1 | 4/2021 | Shen et al. | |
| 2921/0112309 | 4/2021 | Rabbat et al. | |

OTHER PUBLICATIONS

U.S. Appl. No. 15/816,275, filed Nov. 17, 2017, Selection of a Prerecorded Media File for Superimposing Into a Video.

U.S. Appl. No. 16/195,458, U.S. Pat. No. 10,945,042, filed Nov. 19, 2018, Generating an Interactive Digital Video Content Item.

U.S. Appl. No. 17/129,648, filed Dec. 21, 2020, Generating an Interactive Digital Video Content Item.

"U.S. Appl. No. 15/816,117, Final Office Action dated Jun. 11, 2020", 10 pgs.

"U.S. Appl. No. 15/816,117, Final Office Action dated Aug. 14, 2019", 8 pgs.

"U.S. Appl. No. 15/816,117, Non Final Office Action dated Feb. 7, 2019", 7 pgs.

"U.S. Appl. No. 15/816,117, Non Final Office Action dated Nov. 18, 2020", 10 pgs.

"U.S. Appl. No. 15/816,117, Non Final Office Action dated Dec. 2, 2019", 8 pgs.

"U.S. Appl. No. 15/816,117, Notice of Allowance dated Mar. 11, 2021", 17 pgs.

"U.S. Appl. No. 15/816,117, Response filed Feb. 18, 2021 to Non Final Office Action dated Nov. 18, 2020", 13 pgs.

"U.S. Appl. No. 15/816,117, Response filed Mar. 2, 2020 to Non Final Office Action dated Dec. 2, 2019", 19 pgs.

"U.S. Appl. No. 15/816,117, Response filed Apr. 29, 2019 to Non Final Office Action dated Feb. 7, 2019", 12 pgs.

"U.S. Appl. No. 15/816,117, Response filed Oct. 6, 2020 to Final Office Action dated Jun. 11, 2020", 12 pgs.

"U.S. Appl. No. 15/816,117, Response filed Nov. 13, 2019 to Final Office Action dated Aug. 14, 2019", 14 pgs.

"U.S. Appl. No. 15/816,275, Advisory Action dated Jul. 21, 2020", 5 pgs.

"U.S. Appl. No. 15/816,275, Final Office Action dated May 6, 2020", 11 pgs.

"U.S. Appl. No. 15/816,275, Final Office Action dated Oct. 9, 2019", 10 pgs.

"U.S. Appl. No. 15/816,275, Non Final Office Action dated Jan. 23, 2020", 10 pgs.

"U.S. Appl. No. 15/816,275, Non Final Office Action dated Mar. 28, 2019", 8 pgs.

"U.S. Appl. No. 15/816,275, Non Final Office Action dated Aug. 21, 2020", 11 pgs.

"U.S. Appl. No. 15/816,275, Notice of Allowance dated Mar. 10, 2021", 10 pgs.

"U.S. Appl. No. 15/816,275, Response filed Jan. 8, 2020 to Final Office Action dated Oct. 9, 2019", 12 pgs.

"U.S. Appl. No. 15/816,275, Response filed Apr. 23, 2020 to Non Final Office Action dated Jan. 23, 2020", 14 pgs.

"U.S. Appl. No. 15/816,275, Response filed Jun. 18, 2019 to Non Final Office Action dated Mar. 28, 2019", 12 pgs.

"U.S. Appl. No. 15/816,275, Response filed Jul. 2, 2020 to Final Office Action dated May 6, 2020", 8 pgs.

"U.S. Appl. No. 15/816,275, Response filed Aug. 5, 2020 to Advisory Action dated Jul. 21, 2020", 9 pgs.

"U.S. Appl. No. 15/816,275, Response filed Nov. 20, 2020 to Non Final Office Action dated Aug. 21, 2020", 10 pgs.

"U.S. Appl. No. 16/195,458, Final Office Action dated Mar. 6, 2020", 9 pgs.

"U.S. Appl. No. 16/195,458, Non Final Office Action dated Jun. 18, 2020", 9 pgs.

"U.S. Appl. No. 16/195,458, Non Final Office Action dated Oct. 25, 2019", 8 pgs.

"U.S. Appl. No. 16/195,458, Notice of Allowance dated Nov. 2, 2020", 5 pgs.

"U.S. Appl. No. 16/195,458, Response filed Jan. 24, 2020 to Non Final Office Action dated Oct. 25, 2019", 16 pgs.

"U.S. Appl. No. 16/195,458, Response filed Oct. 15, 2020 to Non Final Office Action dated Jun. 18, 2020", 9 pgs.

* cited by examiner 700 (cont.)

SUPERIMPOSE THE PRERECORDED MEDIA FILE OVER THE VIDEO
760

PLACE THE PRERECORDED VIDEO FILE OVER THE VIDEO AT A PARTICULAR DISTANCE USING THE DEPTH INFORMATION
762

PLACE THE PRERECORDED VIDEO OVER THE VIDEO SUCH THAT THE PRERECORDED VIDEO FILE IS INTEGRATED INTO THE SCENE
764

IDENTIFY A FLAT REGION OF THE SCENE
766

PLACE THE PRERECORDED VIDEO OVER THE VIDEO AT THE FLAT REGION
768

PLACE THE PRERECORDED VIDEO FILE OVER THE VIDEO WITHOUT OBSCURING A SYMBOL
770

PLAY THE PRERECORDED VIDEO FILE WHILE DISPLAYING THE VIDEO
780

FIG. 7B

SELECTION OF A PRERECORDED MEDIA FILE FOR SUPERIMPOSING INTO A VIDEO

CLAIM OF PRIORITY

This application is a continuation of U.S. patent application Ser. No. 15/816,275, filed Nov. 17, 2017, which is incorporated herein by reference in its entirety.

BACKGROUND

Mobile electronic devices, such as those configured to be handheld or otherwise associated with a user, are employed in a wide variety of applications and environments. The ubiquity of devices such as mobile phones, smart phones, and other similar devices indicates the popularity and desire for these types of devices. Mobile electronic devices are increasingly used to interact with the physical environment.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 7A and 7B illustrate a flow diagram of an example method for selecting of a prerecorded media file for superimposing into a video, according to various embodiments.

DESCRIPTION OF EMBODIMENTS

Figure 1:
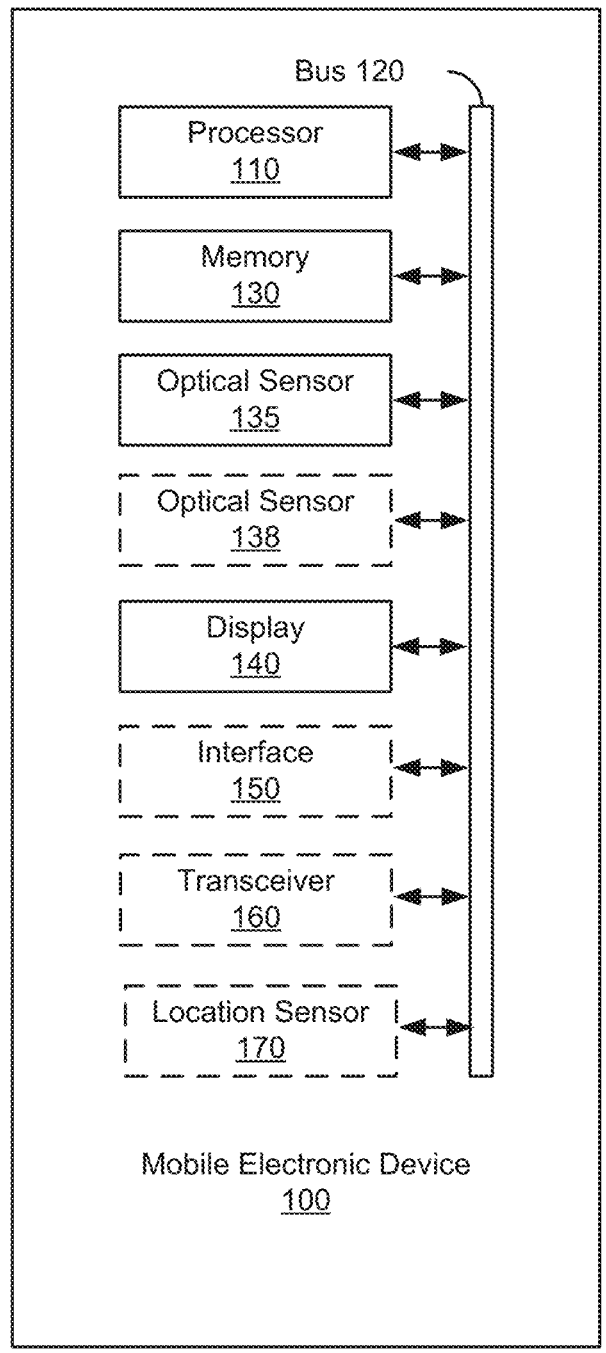
FIG. 1 is a block diagram of an example mobile electronic device, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying," "receiving," "superimposing," "playing," "capturing," "determining," "using," "placing," "selecting," "performing," "searching," or the like, refer to the actions and processes of an electronic device such as: a processor, a processor, an optical sensor, a sensor, a memory, a mobile electronic device, a sensor processing unit, a sensor processor, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. Examples of superimposing a prerecorded media file into a video are then described. Examples of selection of a prerecorded media file for superimposing into a video are then described. Example operations of superimposing a prerecorded media file into a video and selection of a prerecorded media file for superimposing into a video are then described.

In accordance with various embodiments, methods for superimposing a prerecorded media file into a video are provided. A video of a scene is displayed on a display device of a mobile electronic device. A prerecorded video file to render on the display device is received. The prerecorded video file is superimposed over the video, such that the video is partially obscured by the prerecorded video file. The prerecorded video file is played while displaying the video, such that the prerecorded video file and a non-obscured portion of the video are rendered simultaneously. In some embodiments, live video is captured at a video capture device of the mobile electronic device, such that the video displayed on the display device is the live video.

Mobile electronic devices, in accordance with some described embodiments, include cameras and display screens (e.g., displays or display devices). These mobile electronic devices are capable for showing a user a live video of a scene the user is looking at (e.g., directing the camera towards). Embodiments described herein provide for the superimposing of prerecorded video files over the live video, such that the prerecorded video file displays content over the live video. This content can be related to an object within the scene (e.g., a particular location, an identified symbol or logo, an identified word or phrase, etc.) In some embodiments, the superimposed prerecorded video content can appear as if it is part of the geography of the scene, integrating directly into the scene.

Embodiments described herein pertain to superimposing a prerecorded media file into a video. In one embodiment, the prerecorded media file is a Graphics Interchange Format (GIF) file. While embodiments described herein pertain to GIF files, it should be appreciated that other types of prerecorded media files, such as other types of video files, can be used herein. Moreover, it should be appreciated that any type of media file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc.

In some embodiments, the prerecorded video file is selectable for interactivity. For example, a user may interact with a prerecorded video file (e.g., touching it via a touch screen) to execute an action. For example, a user interaction with a prerecorded video file may open up an Internet browser application and navigate to a particular website. In other examples, a user interaction with a prerecorded video file may show content (e.g., a coupon or product information). In some embodiments, the prerecorded video file may be transformed as a result of a user interaction (e.g., the prerecorded video file can be resized or moved within a display).

In some embodiments, depth information of the scene captured within the video is determined. The depth information defines distances of points of the scene from a video capture device, such that the depth information comprises relative depths of the points of the scene based on a position of the video capture device.

In one embodiment, the prerecorded video file is placed over the video at a particular distance from the position of the video capture device based on the depth information. In another embodiment, the prerecorded video file is placed over the video at the distances that the points of the scene are from the video capture device based on the depth information, such that the prerecorded video file is visually integrated into the scene. In one embodiment, the depth information includes surface contours of objects within the scene, such that the prerecorded video file is placed over the video following the surface contours of the objects. In another embodiment, a flat region of the scene within the video is identified based on the depth information. The prerecorded video file is placed over the video at the flat region of the scene, such that the prerecorded video file is visually integrated into the scene at the flat region.

In accordance with some embodiments, methods for selecting of a prerecorded media file for superimposing into a video are provided. A video of a scene is displayed on a display device of a mobile electronic device. A location of the scene is determined. A prerecorded video file is selected based at least in part on the location. The prerecorded video file is superimposed over the video, such that the video is partially obscured by the prerecorded video file. In one embodiment, the prerecorded video file is an advertisement related to the location. In another embodiment, the prerecorded video file is a user-generated video file selected from a library of media files. The prerecorded video file is played while displaying the video, such that the prerecorded video file and a non-obscured portion of the video are rendered simultaneously. In some embodiments, live video is captured at a video capture device of the mobile electronic device, such that the video displayed on the display device is the live video.

The selection of a prerecorded video file to superimpose over a scene may be based on a location of the scene. For example, where the scene is a physical place of business (e.g., a restaurant or a clothing store), a prerecorded video file related to that physical place may be superimposed over the video of the scene, to enhance the user's experience of viewing the scene. For instance, the prerecorded video file may be an advertisement for the place of business, a coupon for use upon purchasing an item from the business, or any other information chosen by the proprietor of the business (e.g., information on the benefits of a product sold by the business.

In another example, the prerecorded video file that is selected for superimposing is user-generated content. For example, a user of the mobile electronic device can subscribe to prerecorded video file feeds or can be linked to prerecorded video files via a social network friend connection. Upon identifying a location, a prerecorded video file can be superimposed over the scene to enhance the appearance of the scene. For example, a prerecorded video file can appear to decorate or adorn a structure in a neighborhood (e.g., a wall, a billboard, a skyline, etc.). In another example, a prerecorded video file may be superimposed over or around an identified symbol.

In one embodiment, the location of the scene is determined using a navigation satellite system sensor (e.g., Global Positioning System (GPS) sensor) of the mobile electronic device. In another embodiment, the location of the scene is determined using a third party application (e.g., Foursquare, Yelp). In another embodiment, symbol recognition is performed on the video to identify at least one symbol (e.g., logo, word, phrase, etc.) A location database is searched for the symbol to determine the location. In some embodiment, the prerecorded video file is placed over the video without obscuring the at least one symbol.

Embodiments described herein provide methods for superimposing a prerecorded media file into a video and selection of a prerecorded media file for superimposing into a video. The described embodiments provide visual enhancements to scenes within the video, providing a richer and deeper user experience. By superimposing a prerecorded video file over a live video, the scene captured by the live video is made fuller, providing enriched user interaction with their surroundings, promoting interaction with the object of a scene (e.g., item for purchase, place of business, etc.) beyond the confines of the real-world view of the location captured by the scene.

Example Mobile Electronic Device

Turning now to the figures, FIG. 1 is a block diagram of an example mobile electronic device 100. As will be appreciated, mobile electronic device 100 may be implemented as a device or apparatus, such as a handheld mobile electronic device, that can be moved in space by a human user. That is, mobile electronic device 100 is small enough to be held in the hand of a human user, in various embodiments. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, a headset, or a combination of one or more of these devices.

As depicted in FIG. 1, mobile electronic device 100 may include a processor 110, a bus 120, a memory 130, at least one optical sensor 135, and a display 140. Some embodiments of mobile electronic device 100 may further include one or more of an interface 150, a transceiver 160 (all depicted in dashed lines), a location sensor 170, and/or other components. In various embodiments, electrical power for mobile electronic device 100 is provided by a mobile power source such as a battery, when not being actively charged.

Processor 110 can be one or more microprocessors, central processing units (CPUs), DSPs, general purpose microprocessors, ASICs, ASIPs, FPGAs or other processors which run software programs or applications, which may be stored in memory 130, associated with the functions and capabilities of mobile electronic device 100.

Bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, processor 110, memory 130, display 140, interface 150, transceiver 160, and other components of mobile electronic device 100 may be coupled communicatively through bus 120 in order to exchange commands and data. Depending on the architecture, different bus configurations may be employed as desired. For example, additional buses may be used to couple the various components of mobile electronic device 100, such as by using a dedicated bus between processor 110 and memory 130.

Memory 130 can be any suitable type of memory, including but not limited to electronic memory (e.g., read only memory (ROM), random access memory, or other electronic memory), hard disk, optical disk, or some combination thereof. Multiple layers of software can be stored in memory 130 for use with/operation upon processor 110. For example, an operating system layer can be provided for mobile electronic device 100 to control and manage system resources in real time, enable functions of application software and other layers, and interface application programs with other software and functions of mobile electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 100, and in some of those embodiments, multiple applications can run simultaneously as part of the user experience system. In some embodiments, the user experience system, operating system, and/or the processor 110 may operate in a low-power mode (e.g., a sleep mode) where very few instructions are processed. Such a low-power mode may utilize only a small fraction of the processing power of a full-power mode (e.g., an awake mode) of the processor 110.

Optical sensor 135 may comprise, without limitation: a video capture device, a camera, and infrared camera, or other type of optical sensor for capturing a video of a person, an object, and/or a scene. It should be appreciated that mobile electronic device 100 may include more than one optical sensor. In one example, optical sensor 135 is a back-side optical sensor (e.g., rear-facing camera) and optical sensor 138 is a front-side optical sensor (e.g., front-facing camera).

Display 140, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. Display 140 is configured to display video captured at optical sensor 135 (and optical sensor 138, when included).

Interface 150, when included, can be any of a variety of different devices providing input and/or output to a user, such as audio speakers, touch screen integrated with display 140, real or virtual buttons, joystick, slider, knob, printer, scanner, computer network I/O device, other connected peripherals and the like.

Transceiver 160, when included, may be one or more of a wired or wireless transceiver which facilitates receipt of data at mobile electronic device 100 from an external transmission source and transmission of data from mobile electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Location sensor 170, when included, may be a sensor for determining a location of mobile electronic device 100, such as a navigation satellite system sensor such as a Global Navigation Satellite System (GNSS) receiver (e.g., Global Positioning System (GPS) sensor) a and/or other component configured to determine the location of mobile electronic device 100 from external radio signals. It is noted that the functionality of location sensor 170 may be implemented by processor 110.

Figure 2:
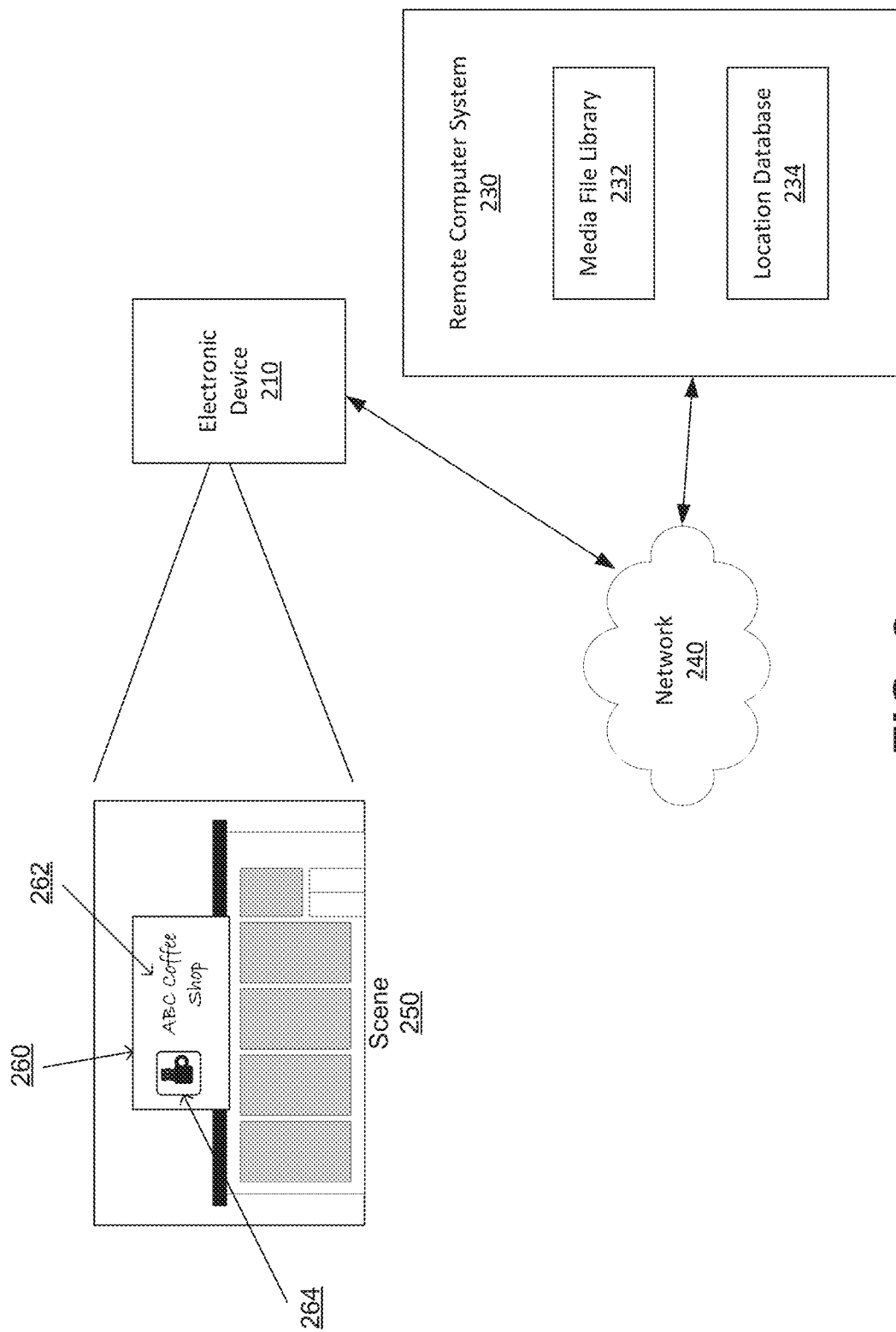
FIG. 2 illustrates an example network upon which embodiments described herein may be implemented.

Example Network and System for Superimposing Prerecorded Video Files into a Video FIG. 2 illustrates an example communication network 240 upon which embodiments described herein may be implemented. FIG. 2 illustrates electronic device 210 and remote computer system 230 which are communicatively coupled via network 240. It should be appreciated that electronic device 210 may be implemented as a mobile electronic device 100, and/or include any combination of the components of mobile electronic device 100.

Electronic device 210 is capable of displaying video of scene 250 (e.g., at display 140). In one embodiment, scene 250 is captured at a video capture device (e.g., optical sensor 135-1) of electronic device 210. Electronic device 210 may be associated with a particular user.

In one embodiment, remote computer system 230 is a server including a media file library 232. A media file can be any type of file that can be rendered on an electronic device 210 (e.g., a prerecorded video file). It should be appreciated that any type of media file format can be used in accordance with the described embodiments, including but not limited to Graphics Interchange Format (GIF), WebM, WebP, MPEG-4 (MP4), Animated Portable Network Graphics (APNG), Motion JPEG, Flash video (FLV), Windows Media video, M4V, etc.

In some embodiments, electronic device 210 is capable of accessing media file library 232 for retrieving a prerecorded media file. It should be appreciated that electronic device 210 may include media file library 232, or that media file library 232 may be distributed across both electronic device 210 and remote computer system 230. For example, a subset of media files of media file library 232 may be maintained within memory of electronic device 210 (e.g., frequently used media files) for access that does not require communication over network 240.

In some embodiments, a prerecorded video file for superimposing over a video is selected based at least in part on the location of the scene. For example, where scene 250 is a physical place of business (e.g., a coffee shop), a prerecorded video file related to that business may be superimposed over the video of the scene, to enhance the user's experience of viewing the scene. For instance, the prerecorded video file may be an advertisement for the place of business, a coupon for use upon purchasing an item from the business, or any other information chosen by the proprietor of the business (e.g., information on the benefits of a product sold by the business).

In some embodiments, the prerecorded video file is selectable for interactivity. For example, a user may interact with a prerecorded video file (e.g., touching it via a touch screen) to execute an action. For example, a user interaction with a prerecorded video file may open up an Internet browser application and navigate to a particular website. In other examples, a user interaction with a prerecorded video file may show content (e.g., a coupon or product information). In some embodiments, the prerecorded video file may be transformed as a result of a user interaction (e.g., the prerecorded video file can be resized or moved within a display).

In one embodiment, the location of the scene is determined using a location sensor (e.g., location sensor 170) of the mobile electronic device. In another embodiment, the location of the scene is determined using a third party application (e.g., Foursquare, Yelp). In another embodiment, symbol recognition is performed on the video to identify at least one symbol (e.g., logo, word, phrase, etc.) With reference to FIG. 2, scene 250 depicts an exterior of a business including a sign 260. Sign 260 may include a text name 262 (e.g., ABC Coffee Shop) and/or a logo 264. In one embodiment, symbol recognition is performed on text name 262 and/or a logo 264. A location database 234 of locations associated with identified symbols is searched for the symbol to determine the location. It should be appreciated that the location may refer to a name and/or type of business rather than a specific instance of a business (e.g., the location is a Starbucks coffee shop, rather than one specific Starbucks).

Embodiments described herein provide a prerecorded video file superimposed over a video, wherein the prerecorded video file and non-obscured portion of the video are rendered simultaneously. FIGS. 3A through 3E illustrate examples of a prerecorded video file superimposed over a video, in accordance with various embodiments.

Figure 3A:
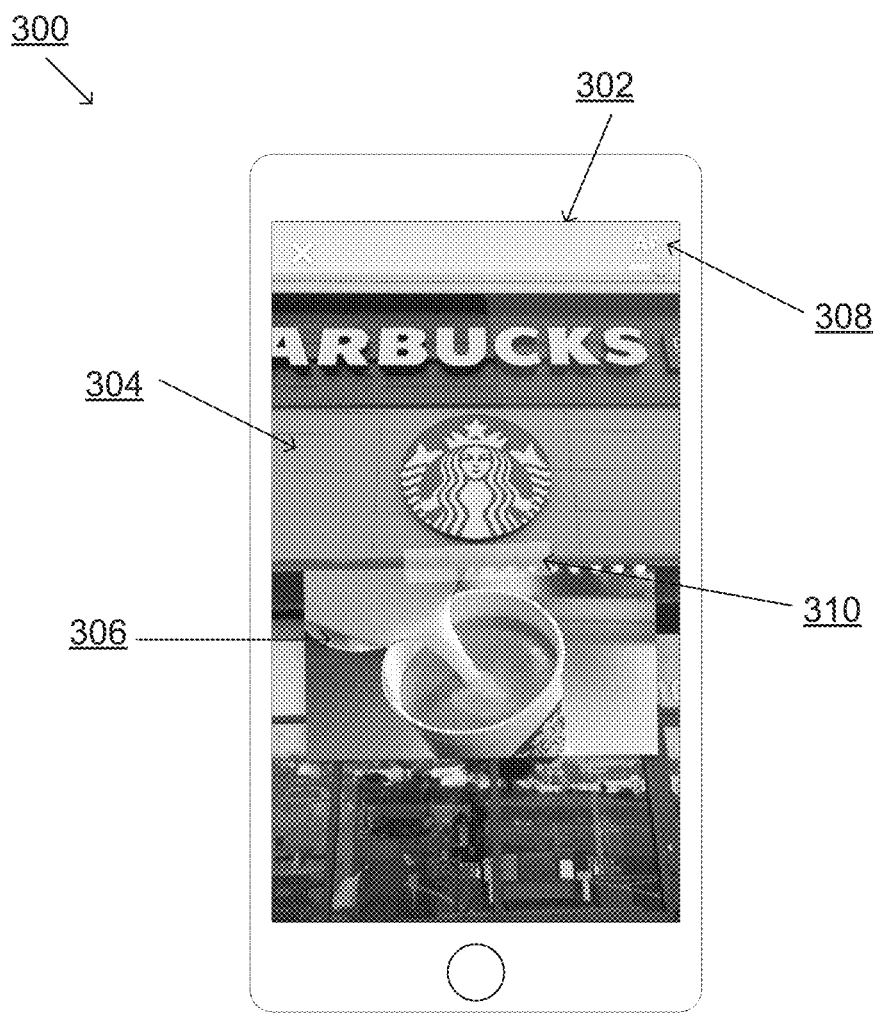
FIGS. 3A through 3E illustrate examples of a prerecorded video file superimposed over a video, in accordance with various embodiments.

FIG. 3A illustrates an example mobile electronic device 300 having a display 302. As illustrated, display 302 is displaying video 304, where video 304 depicts a scene of a business location (e.g., a Starbucks coffee shop). In one embodiment, video 304 is a live video captured by a video capture device (e.g., a rear-facing camera) of mobile electronic device 300. It should be appreciated that in accordance with other embodiments, video 304 may be captured at another mobile electronic device, and transmitted to mobile electronic device 300 for rendering on display 302, either in real-time (e.g., live) or time delayed.

In one embodiment, video 304 is rendered via a camera application of mobile electronic device 300. In another embodiment, video 304 is rendered via an application of mobile electronic device 300 for superimposing a prerecorded video file over video 304. It should be appreciated that the superimposing of a prerecorded video file over a video may be performed at a standalone application of mobile electronic device 300 or via a plugin/modification of an existing application of mobile electronic device 300. In one embodiment, the superimposing of a prerecorded video file over video 304 is executed responsive to a user interaction with control element 308. Control element 308 is operable to activate/deactivate the superimposing of a prerecorded video file over video 304.

Mobile electronic device 300 also plays prerecorded video file 306 over video 304. Prerecorded video file 306, as illustrated, includes subject matter related to the business location illustrated in video 304. In some embodiments, prerecorded video file 306 is selected based on the location of the scene of video 304. For example, since video 304 is a video of a Starbucks coffee shop, prerecorded video file 306 depicts pouring and preparation of a cup of coffee, so as to entice the user of mobile electronic device 300 to visit the coffee shop. It should be appreciated that in some embodiments, prerecorded video file 306 is positioned within display 302 so as to not obscure important visual elements of video 304 (e.g., the name of the business location, the logo of the business location, etc.)

In one embodiment, static element 310 is also rendered on display 302. Static element 310 is an element for visually indicating that prerecorded video file 306 is virtually held in place in space. For example, as illustrated, static element 310 depicts a piece of tape, indicating that prerecorded video file 306 is virtually fixed in space via static element 310. Other examples of static element 310 include a picture frame, a staple, an easel, etc.

Figure 3B:
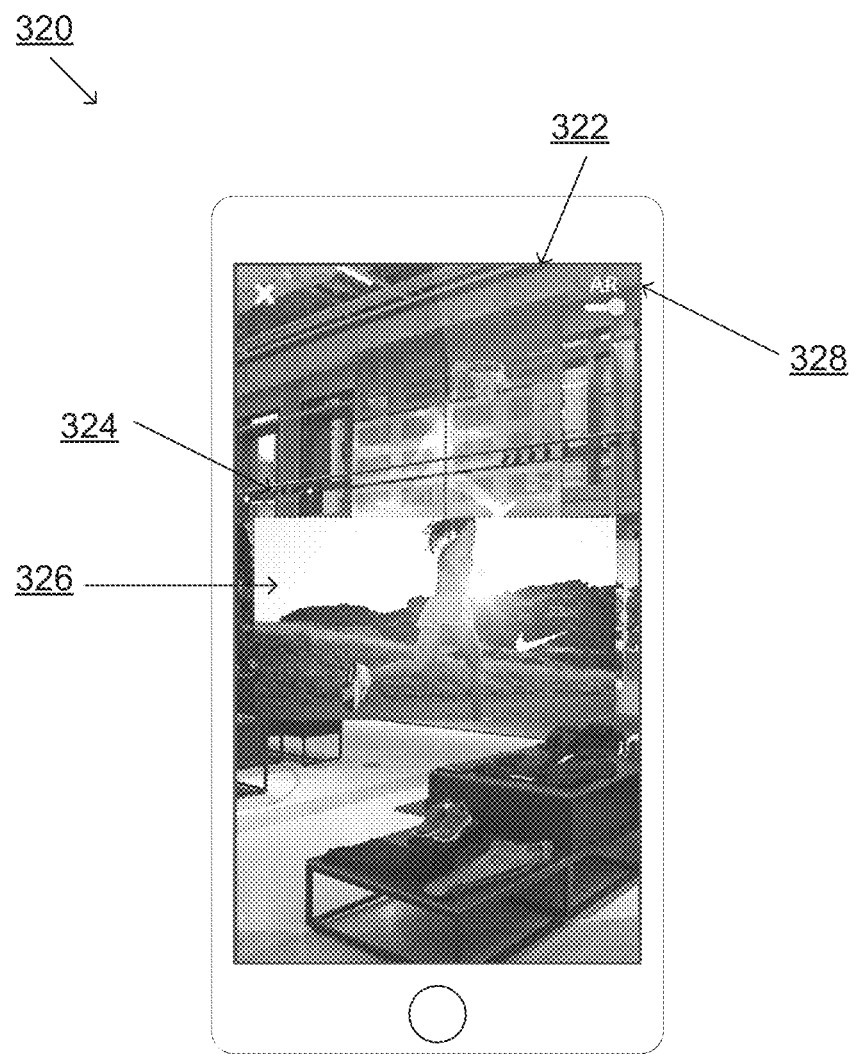

FIG. 3B illustrates an example mobile electronic device 320 having a display 322. As illustrated, display 322 is displaying video 324, where video 324 depicts a scene of a business location (e.g., an athletic clothing store). In one embodiment, video 324 is a live video captured by a video capture device (e.g., a rear-facing camera) of mobile electronic device 320. It should be appreciated that in accordance with other embodiments, video 324 may be captured at another mobile electronic device, and transmitted to mobile electronic device 320 for rendering on display 322, either in real-time (e.g., live) or time delayed.

In one embodiment, video 324 is rendered via a camera application of mobile electronic device 320. In another embodiment, video 324 is rendered via an application of mobile electronic device 320 for superimposing a prerecorded video file over video 324. It should be appreciated that the superimposing of a prerecorded video file over a video may be performed at a standalone application of mobile electronic device 320 or via a plugin/modification of an existing application of mobile electronic device 320. In one embodiment, the superimposing of a prerecorded video file over video 324 is executed responsive to a user interaction with control element 328. Control element 328 is operable to activate/deactivate the superimposing of a prerecorded video file over video 324.

Mobile electronic device 320 also plays prerecorded video file 326 over video 324. Prerecorded video file 326, as illustrated, includes subject matter related to the business location illustrated in video 324. In some embodiments, prerecorded video file 326 is selected based on the location of the scene of video 324. For example, since video 324 is a video of an athletic clothing store, prerecorded video file 326 depicts a person running using athletic clothing and shoes available for sale at the athletic clothing store, so as to entice the user of mobile electronic device 320 to purchase clothing and/or shoes. It should be appreciated that in some embodiments, prerecorded video file 326 is positioned within display 322 so as to not obscure important visual elements of video 324 (e.g., the name of the business location, the logo of the business location, the depicted clothing and/or shoes, etc.)

Figure 3C:
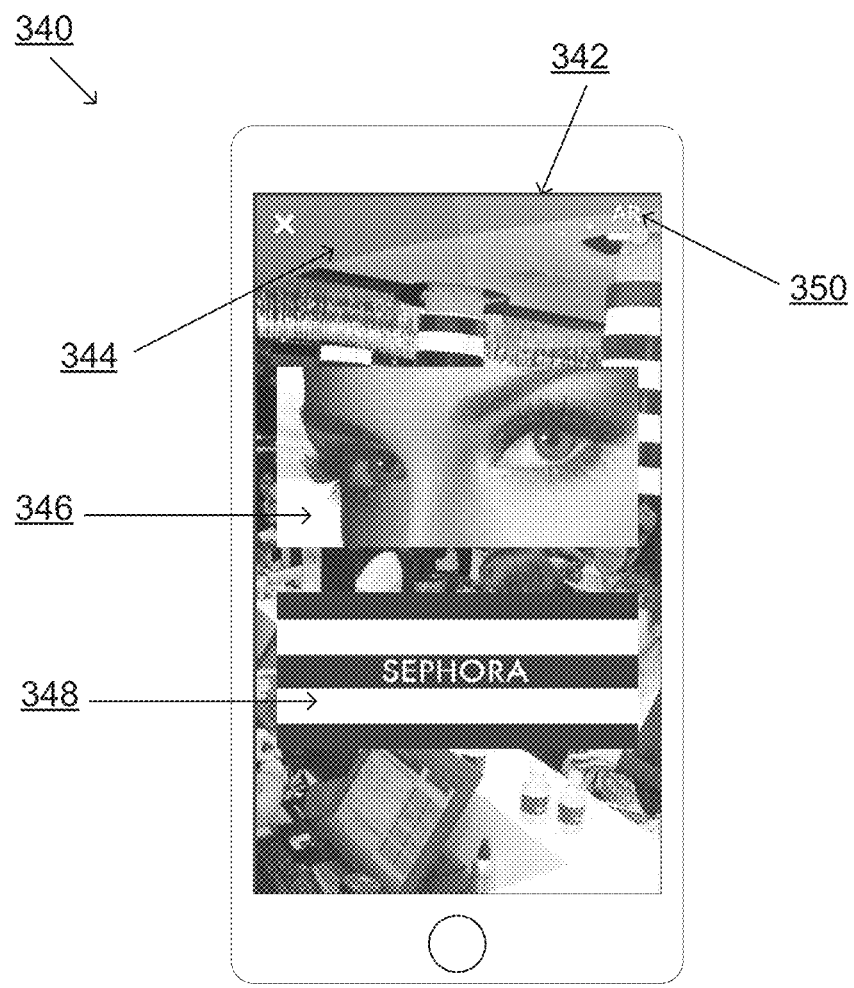

FIG. 3C illustrates an example mobile electronic device 340 having a display 342. As illustrated, display 342 is displaying video 344, where video 344 depicts a scene of a business location (e.g., a Sephora cosmetics shop). In one embodiment, video 344 is a live video captured by a video capture device (e.g., a rear-facing camera) of mobile electronic device 340. It should be appreciated that in accordance with other embodiments, video 344 may be captured at another mobile electronic device, and transmitted to mobile electronic device 340 for rendering on display 342, either in real-time (e.g., live) or time delayed.

In one embodiment, video 344 is rendered via a camera application of mobile electronic device 340. In another embodiment, video 344 is rendered via an application of mobile electronic device 340 for superimposing a prerecorded video file over video 344. It should be appreciated that the superimposing of a prerecorded video file over a video may be performed at a standalone application of mobile electronic device 340 or via a plugin/modification of an existing application of mobile electronic device 340. In one embodiment, the superimposing of a prerecorded video file over video 344 is executed responsive to a user interaction with control element 350. Control element 350 is operable to activate/deactivate the superimposing of a prerecorded video file over video 344.

Mobile electronic device 340 also plays prerecorded video files 346 and 348 over video 344. Prerecorded video files 346 and 348, as illustrated, include subject matter related to the business location illustrated in video 344. In some embodiments, prerecorded video files 346 and 348 are selected based on the location of the scene of video 344. For example, since video 344 is a video of a cosmetics shop, prerecorded video file 346 depicts cosmetics in user and prerecorded video file 348 illustrates a video of the logo/name of the cosmetics shop, so as to entice the user of mobile electronic device 340 to visit the coffee shop. It should be appreciated that in some embodiments, prerecorded video files 346 and 348 are positioned within display 342 so as to not obscure important visual elements of video 344 (e.g., the name of the business location, the logo of the business location, products available for purchase, etc.)

Figure 3D:
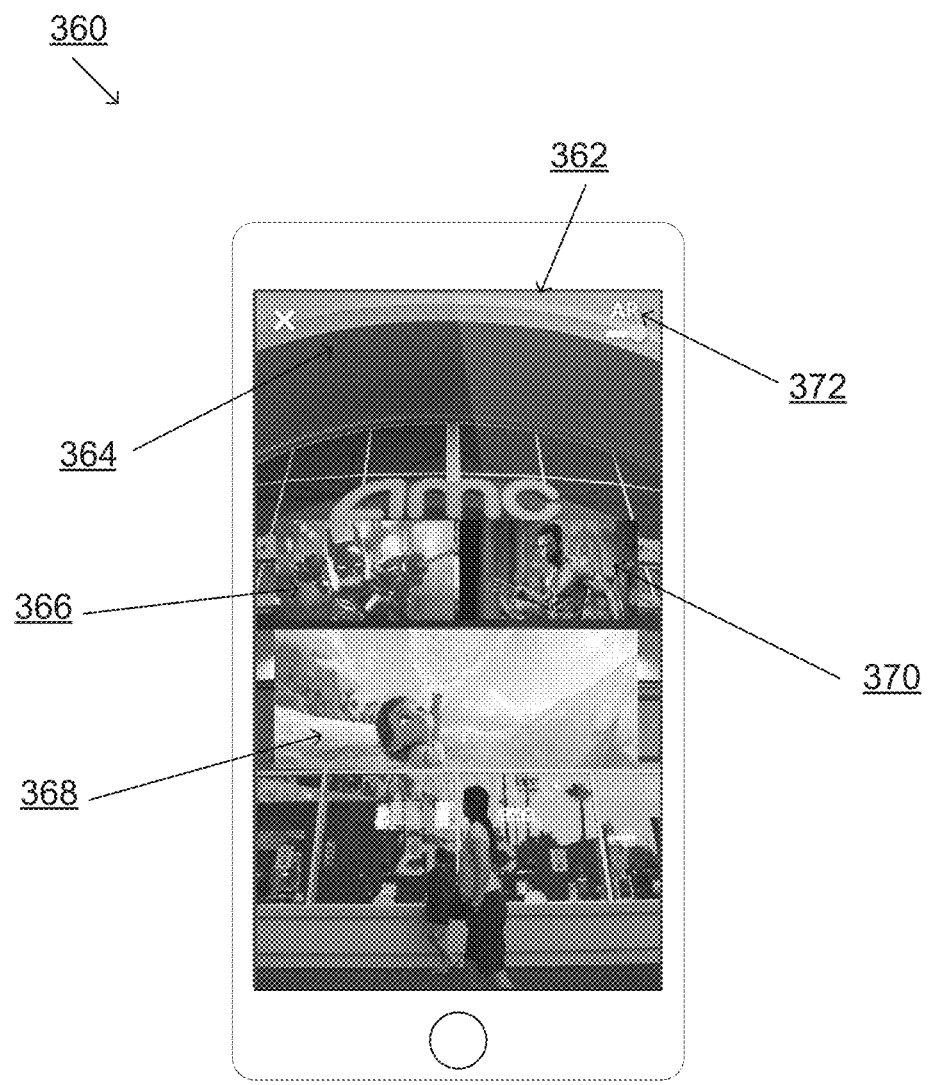

FIG. 3D illustrates an example mobile electronic device 360 having a display 362. As illustrated, display 362 is displaying video 364, where video 364 depicts a scene of a business location (e.g., a movie theater). In one embodiment, video 364 is a live video captured by a video capture device (e.g., a rear-facing camera) of mobile electronic device 360. It should be appreciated that in accordance with other embodiments, video 364 may be captured at another mobile electronic device, and transmitted to mobile electronic device 360 for rendering on display 362, either in real-time (e.g., live) or time delayed.

In one embodiment, video 364 is rendered via a camera application of mobile electronic device 360. In another embodiment, video 364 is rendered via an application of mobile electronic device 360 for superimposing a prerecorded video file over video 364. It should be appreciated that the superimposing of a prerecorded video file over a video may be performed at a standalone application of mobile electronic device 360 or via a plugin/modification of an existing application of mobile electronic device 360. In one embodiment, the superimposing of a prerecorded video file over video 364 is executed responsive to a user interaction with control element 372. Control element 372 is operable to activate/deactivate the superimposing of a prerecorded video file over video 364.

Mobile electronic device 360 also plays prerecorded video files 366, 368, and 370 over video 364. Prerecorded video files 366, 368, and 370 as illustrated, include subject matter related to the business location illustrated in video 364. In some embodiments, prerecorded video files 366, 368, and 370 are selected based on the location of the scene of video 364. For example, since video 364 is a video of a cosmetics shop, prerecorded video files 366, 368, and 370 illustrate videos of movie previews for movies currently showing at the movie theater, so as to entice the user of mobile electronic device 360 to see a movie at the movie theater and to guide the user in the selection of a particular movie. It should be appreciated that in some embodiments, prerecorded video files 366, 368, and 370 are positioned within display 362 so as to not obscure important visual elements of video 364 (e.g., the name of the business location, the logo of the business location, etc.)

Figure 3E:
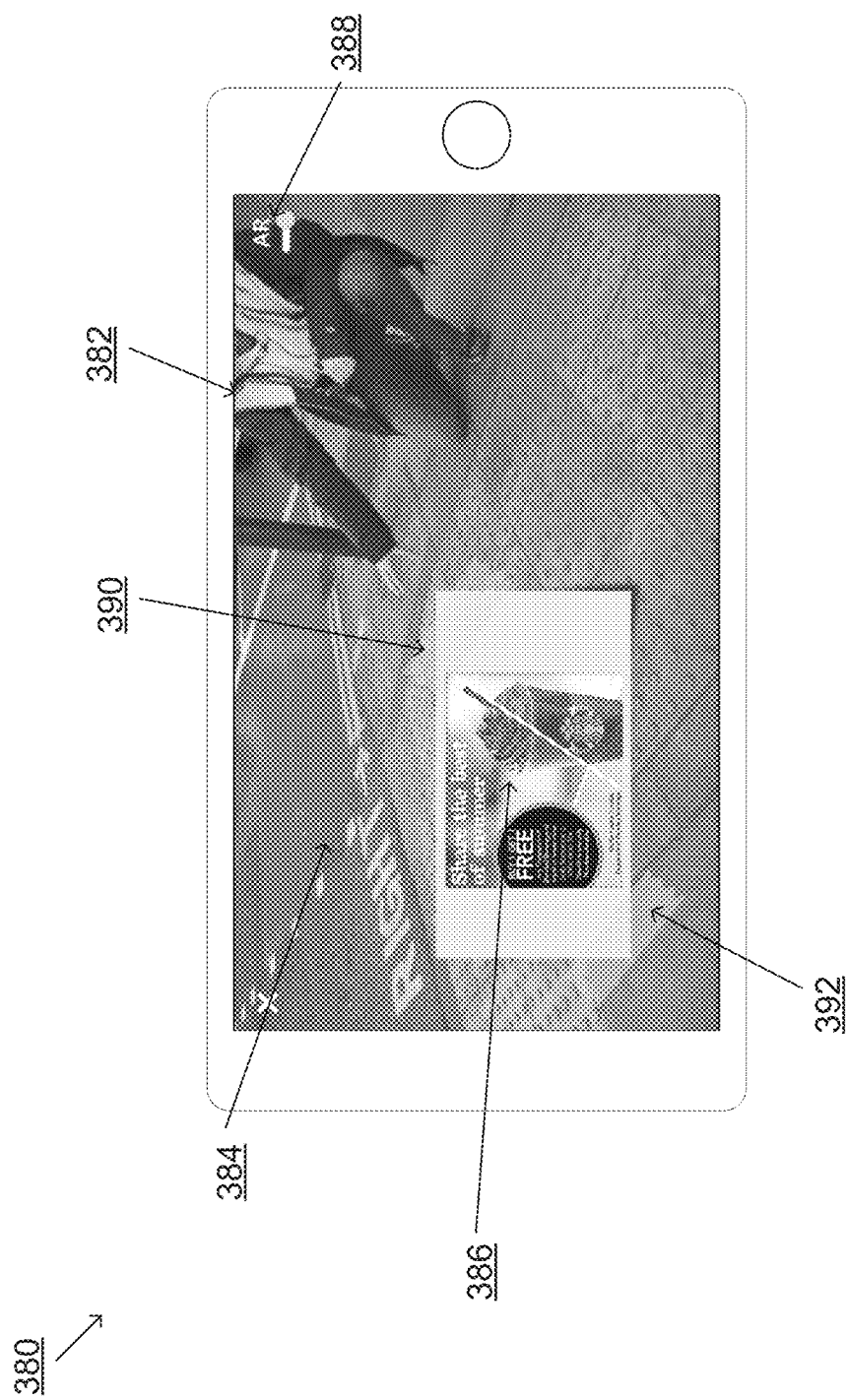

FIG. 3E illustrates an example mobile electronic device 380 having a display 382. As illustrated, display 382 is displaying video 384, where video 384 depicts a scene of a sidewalk (e.g., a sidewalk near or in front of a business). In one embodiment, video 384 is a live video captured by a video capture device (e.g., a rear-facing camera) of mobile electronic device 380. It should be appreciated that in accordance with other embodiments, video 384 may be captured at another mobile electronic device, and transmitted to mobile electronic device 380 for rendering on display 382, either in real-time (e.g., live) or time delayed.

In one embodiment, video 384 is rendered via a camera application of mobile electronic device 380. In another embodiment, video 384 is rendered via an application of mobile electronic device 380 for superimposing a prerecorded video file over video 384. It should be appreciated that the superimposing of a prerecorded video file over a video may be performed at a standalone application of mobile electronic device 380 or via a plugin/modification of an existing application of mobile electronic device 380. In one embodiment, the superimposing of a prerecorded video file over video 384 is executed responsive to a user interaction with control element 388. Control element 388 is operable to activate/deactivate the superimposing of a prerecorded video file over video 384.

Mobile electronic device 380 also plays prerecorded video file 386 over video 384. Prerecorded video file 386, as illustrated, includes subject matter related to a business near the location of the sidewalk illustrated in video 384. In some embodiments, prerecorded video file 386 is selected based on the location of the scene of video 384. For example, video 384 is a video of a sidewalk near or in front of a Starbucks coffee shop. Prerecorded video file 386 depicts a video of a beverage available for purchase at the Starbucks coffee shop and a coupon for that beverage, so as to entice the user of mobile electronic device 380 to visit the coffee shop. It should be appreciated that in some embodiments, prerecorded video file 386 is positioned within display 382 so as to not obscure important visual elements of video 384 (e.g., the name of the business location, the logo of the business location, traffic signs, etc.)

In one embodiment, static elements 390 and 392 are also rendered on display 382. Static elements 390 and 392 are element for visually indicating that prerecorded video file 386 is virtually held in place in space. For example, as illustrated, static elements 390 and 392 depict pieces of tape, indicating that prerecorded video file 386 is virtually fixed in space via static elements 390 and 392. Other examples of static elements 390 and 392 include a picture frame, a staple, an easel, etc.

In some embodiments, depth information of the scene captured within the videos is determined. The depth information defines distances of points of the scene from a video capture device, such that the depth information comprises relative depths of the points of the scene based on a position of the video capture device. In accordance with various embodiments, the depth information can be determined via the image capture device (e.g., a camera such as an infrared camera), or via a software development kit (SDK), such as Google's ARCore or Apple's ARKit.

In various embodiments, the prerecorded video file is placed over the video at a particular distance from the position of the video capture device based on the depth information. For example, as illustrated in FIGS. 3A through 3E, the prerecorded video files are positioned within the display so as to appear at some distance from the user (e.g., two feet) and between the objects of the scene and the user. In such embodiments, the prerecorded videos may appear to float within the scene between objects of the scene and the user.

In another embodiment, the prerecorded video file is placed over the video at the distances that the points of the scene are from the video capture device based on the depth information, such that the prerecorded video file is visually integrated into the scene. In one embodiment, the depth information includes surface contours of objects within the scene, such that the prerecorded video file is placed over the video following the surface contours of the objects. In another embodiment, a flat region of the scene within the video is identified based on the depth information. The prerecorded video file is placed over the video at the flat region of the scene, such that the prerecorded video file is visually integrated into the scene at the flat region.

Figure 4A:
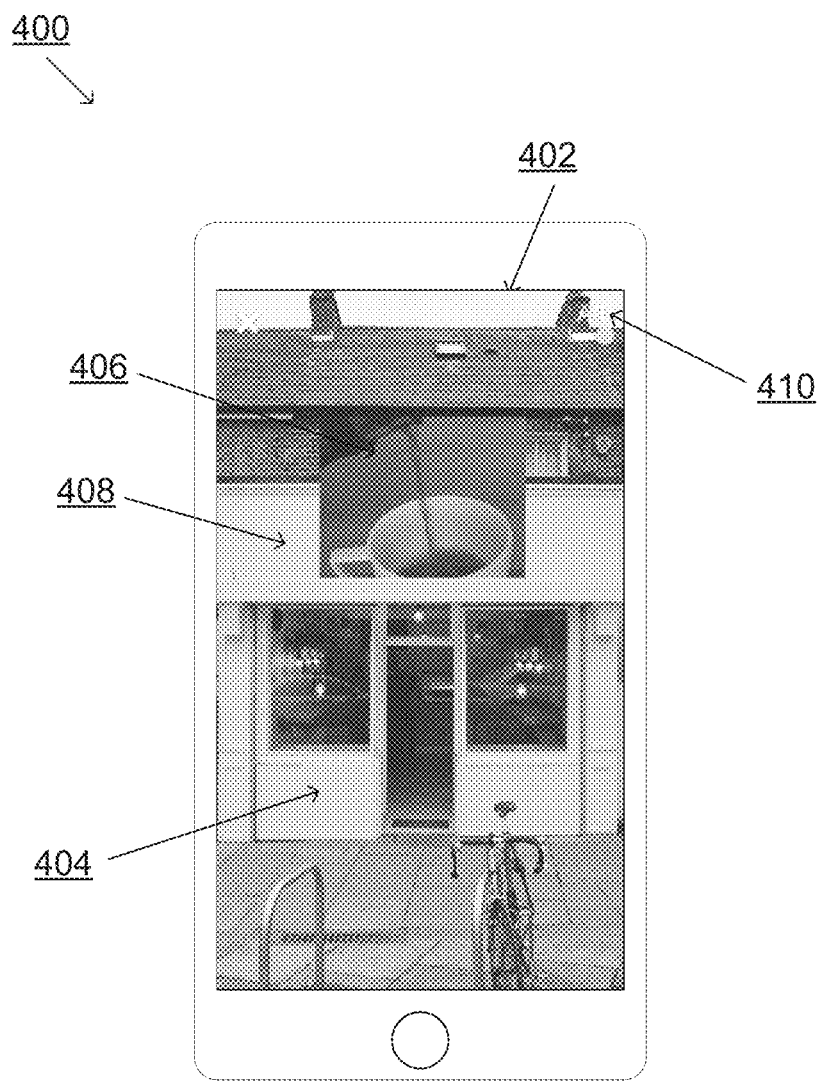
FIGS. 4A through 4C illustrate examples of a prerecorded video file superimposed over a video positioned relative to an object within the video, in accordance with various embodiments.
Figure 4B:
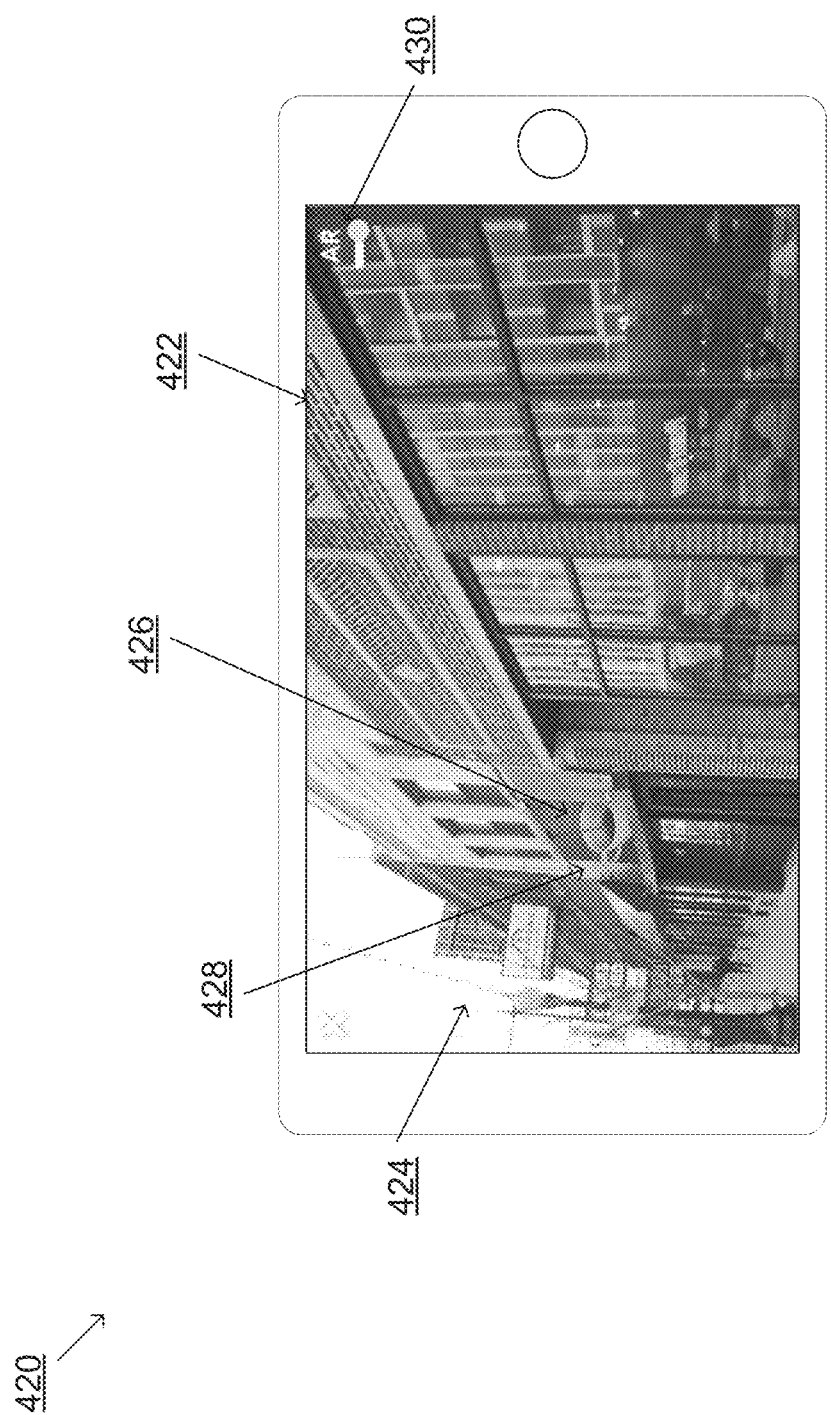
Figure 4C:
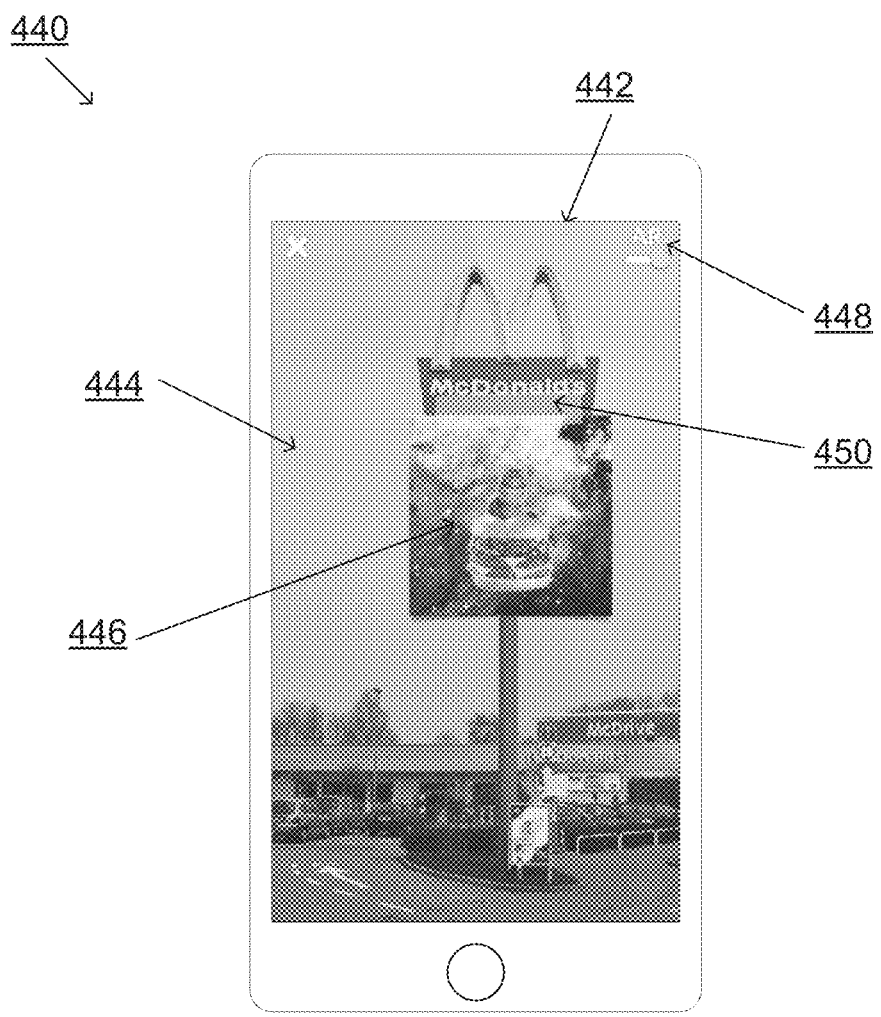

FIGS. 4A through 4C illustrate examples of a prerecorded video file superimposed over a video positioned relative to an object within the video, in accordance with various embodiments. FIG. 4A illustrates an example mobile electronic device 400 having a display 402. As illustrated, display 402 is displaying video 404, where video 404 depicts a scene of a business location (e.g., a local coffee shop). In one embodiment, video 404 is a live video captured by a video capture device (e.g., a rear-facing camera) of mobile electronic device 400. It should be appreciated that in accordance with other embodiments, video 404 may be captured at another mobile electronic device, and transmitted to mobile electronic device 400 for rendering on display 402, either in real-time (e.g., live) or time delayed.

In one embodiment, video 404 is rendered via a camera application of mobile electronic device 400. In another embodiment, video 404 is rendered via an application of mobile electronic device 400 for superimposing a prerecorded video file over video 404. It should be appreciated that the superimposing of a prerecorded video file over a video may be performed at a standalone application of mobile electronic device 400 or via a plugin/modification of an existing application of mobile electronic device 400. In one embodiment, the superimposing of a prerecorded video file over video 404 is executed responsive to a user interaction with control element 410. Control element 410 is operable to activate/deactivate the superimposing of a prerecorded video file over video 404.

Mobile electronic device 400 also plays prerecorded video file 406 over video 404. Prerecorded video file 406, as illustrated, includes subject matter related to the business location illustrated in video 404. In some embodiments, prerecorded video file 406 is selected based on the location of the scene of video 404. For example, since video 404 is a video of a local coffee shop, prerecorded video file 406 depicts pouring and preparation of a cup of coffee, so as to entice the user of mobile electronic device 400 to visit the coffee shop.

As illustrated, video 404 depicts a flat surface 408 within the depicted scene. Flat surface 408 may be, for example, a signage region of the business may be a flat surface or a wall facing may be a flat region. Using depth information, mobile electronic device 400 is operable to position prerecorded video file 406 such that it appears to be integrated within flat surface 408. It should be appreciated that in some embodiments, prerecorded video file 406 is positioned within display 402 so as to not obscure important visual elements of video 404 (e.g., the name of the business location, the logo of the business location, etc.)

FIG. 4B illustrates an example mobile electronic device 420 having a display 422. As illustrated, display 422 is displaying video 424, where video 424 depicts a scene of a business location (e.g., a local coffee shop). In one embodiment, video 424 is a live video captured by a video capture device (e.g., a rear-facing camera) of mobile electronic device 420. It should be appreciated that in accordance with other embodiments, video 424 may be captured at another mobile electronic device, and transmitted to mobile electronic device 420 for rendering on display 422, either in real-time (e.g., live) or time delayed.

In one embodiment, video 424 is rendered via a camera application of mobile electronic device 420. In another embodiment, video 424 is rendered via an application of mobile electronic device 420 for superimposing a prerecorded video file over video 424. It should be appreciated that the superimposing of a prerecorded video file over a video may be performed at a standalone application of mobile electronic device 420 or via a plugin/modification of an existing application of mobile electronic device 420. In one embodiment, the superimposing of a prerecorded video file over video 424 is executed responsive to a user interaction with control element 430. Control element 430 is operable to activate/deactivate the superimposing of a prerecorded video file over video 424.

Mobile electronic device 420 also plays prerecorded video file 426 over video 424. Prerecorded video file 426, as illustrated, includes subject matter related to the business location illustrated in video 424. In some embodiments, prerecorded video file 426 is selected based on the location of the scene of video 424. For example, since video 424 is a video of a local coffee shop, prerecorded video file 426 depicts pouring and preparation of a cup of coffee, so as to entice the user of mobile electronic device 420 to visit the coffee shop.

As illustrated, video 424 depicts a flat surface 428 within the depicted scene. Due to the viewing angle of video 424, flat surface 428 is shown in perspective. Flat surface 428 may be, for example, a signage region of the business may be a flat surface or a wall facing may be a flat region. Using depth information, mobile electronic device 420 is operable to position prerecorded video file 426 in perspective such that it appears to be integrated within flat surface 428. It should be appreciated that in some embodiments, prerecorded video file 426 is positioned within display 422 so as to not obscure important visual elements of video 424 (e.g., the name of the business location, the logo of the business location, etc.)

In one embodiment, video 444 is rendered via a camera application of mobile electronic device 440. In another embodiment, video 444 is rendered via an application of mobile electronic device 440 for superimposing a prerecorded video file over video 444. It should be appreciated that the superimposing of a prerecorded video file over a video may be performed at a standalone application of mobile electronic device 440 or via a plugin/modification of an existing application of mobile electronic device 440. In one embodiment, the superimposing of a prerecorded video file over video 444 is executed responsive to a user interaction with control element 410. Control element 410 is operable to activate/deactivate the superimposing of a prerecorded video file over video 444.

Mobile electronic device 440 also plays prerecorded video file 446 over video 444. Prerecorded video file 446, as illustrated, includes subject matter related to the business location illustrated in video 444. In some embodiments, prerecorded video file 446 is selected based on the location of the scene of video 444. For example, since video 444 is a video of a McDonald's restaurant, prerecorded video file 446 depicts a cat sitting atop a McDonald's hamburger floating in space, so as to entice the user of mobile electronic device 440 to visit the McDonald's restaurant.

As illustrated, video 444 depicts a sign within the depicted scene. Using depth information, mobile electronic device 440 is operable to position prerecorded video file 446 such that it appears to be affixed to the sign. It should be appreciated that in some embodiments, prerecorded video file 446 is positioned within display 442 so as to not obscure important visual elements of video 444 (e.g., the name of the business location, the logo of the business location, etc.)

In one embodiment, static element 450 is also rendered on display 442. Static element 450 is an element for visually indicating that prerecorded video file 446 is virtually held in place in space. For example, as illustrated, static element 450 depicts a piece of tape, indicating that prerecorded video file 446 is virtually affixed to the sign depicted in video 444. Other examples of static element 450 include a picture frame, a staple, an easel, etc.

Figure 5A:
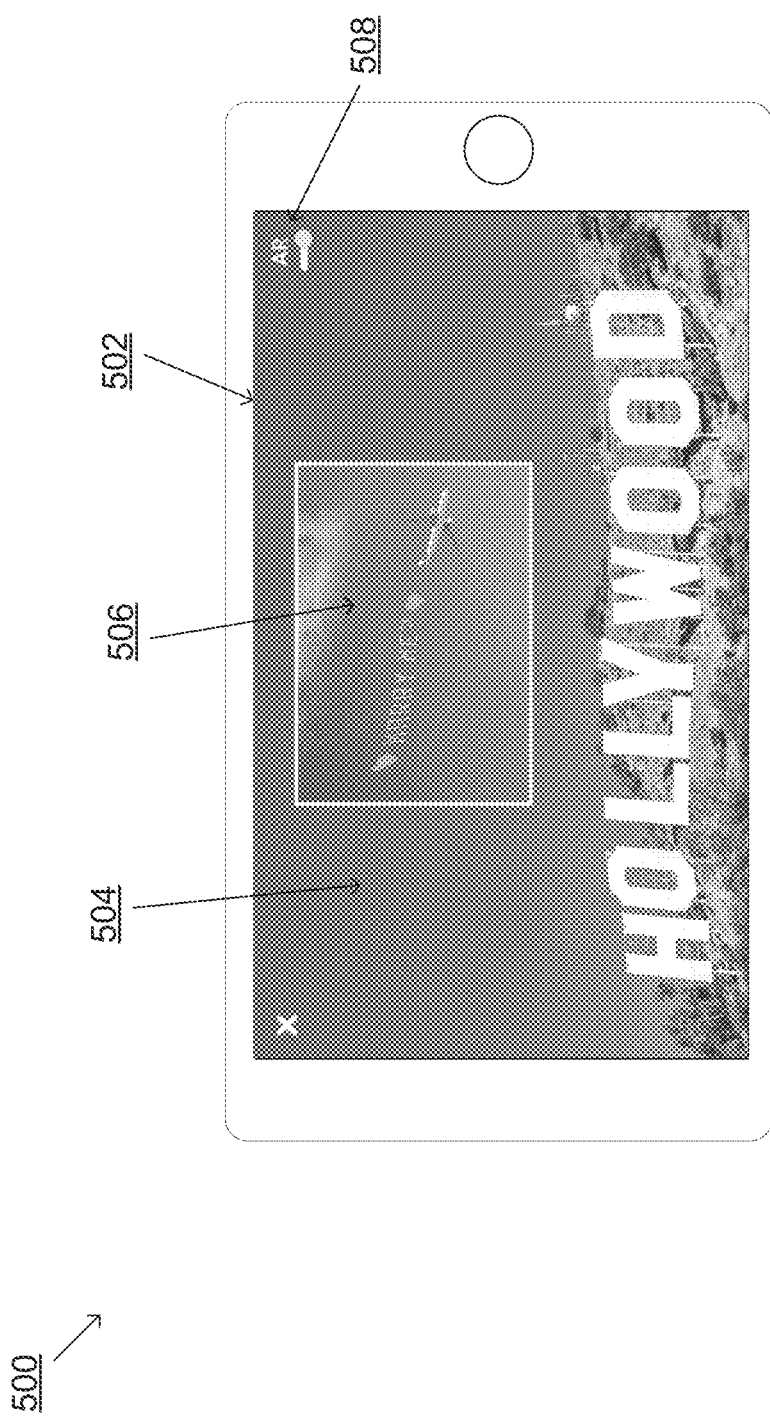
FIGS. 5A through 5C illustrate examples of a user-generated prerecorded video file superimposed over a video positioned relative to an object within the video, in accordance with various embodiments.
Figure 5B:
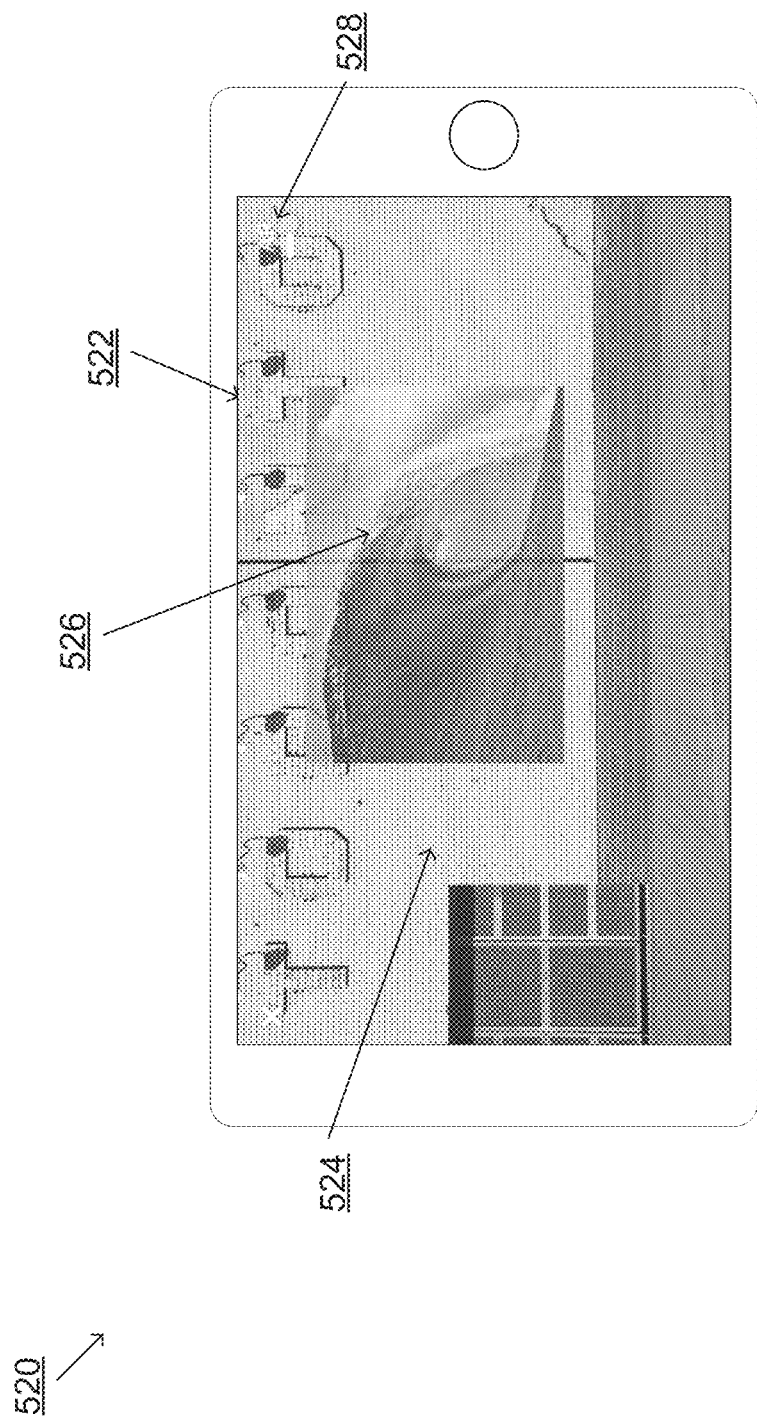
Figure 5C:
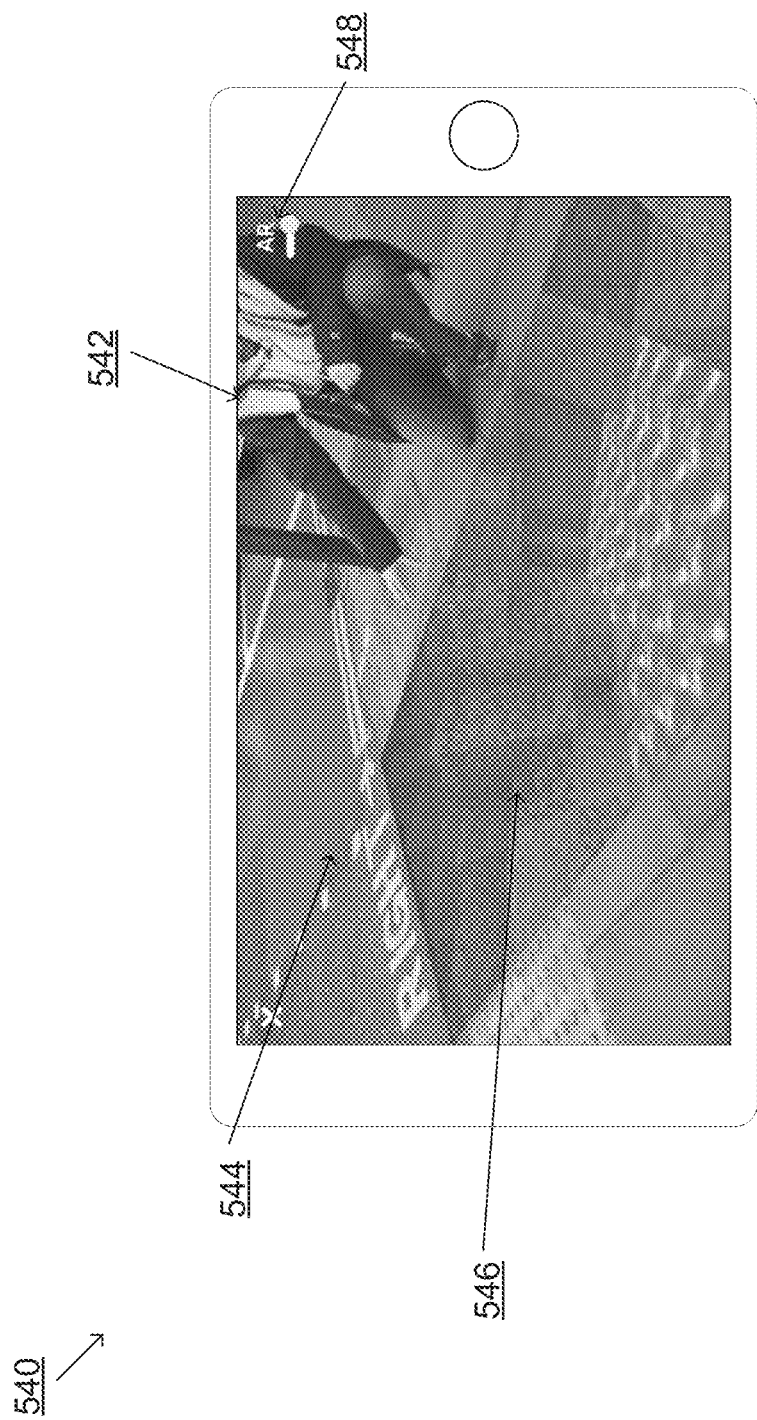

In some embodiments, user-generated content may be used to enhance objects within scenes. FIGS. 5A through 5C illustrate examples of a user-generated prerecorded video file superimposed over a video positioned relative to an object within the video, in accordance with various embodiments.

FIG. 5A illustrates an example mobile electronic device 500 having a display 502. As illustrated, display 502 is displaying video 504, where video 504 depicts a scene of a particular geography (e.g., the Hollywood sign). In one embodiment, video 504 is a live video captured by a video capture device (e.g., a rear-facing camera) of mobile electronic device 500. It should be appreciated that in accordance with other embodiments, video 504 may be captured at another mobile electronic device, and transmitted to mobile electronic device 500 for rendering on display 502, either in real-time (e.g., live) or time delayed.

In one embodiment, video 504 is rendered via a camera application of mobile electronic device 500. In another embodiment, video 504 is rendered via an application of mobile electronic device 500 for superimposing a prerecorded video file over video 504. It should be appreciated that the superimposing of a prerecorded video file over a video may be performed at a standalone application of mobile electronic device 500 or via a plugin/modification of an existing application of mobile electronic device 500. In one embodiment, the superimposing of a prerecorded video file over video 504 is executed responsive to a user interaction with control element 508. Control element 508 is operable to activate/deactivate the superimposing of a prerecorded video file over video 504.

Mobile electronic device 500 also plays prerecorded video file 506 over video 504. Prerecorded video file 506, as illustrated, is a user-generated video file that conveys information desired by the creator that is received and superimposed over video 504 responsive to determining a location associated with prerecorded video file 506. In the illustrated example, prerecorded video file 506 includes a depiction of an airplane dragging a banner including the message "Marry me?" which may be specific to a particular user of mobile electronic device 500. Prerecorded video file 506 enhances the experience of the user of mobile electronic device 500 by conveying a particular message to that user. It should be appreciated that in some embodiments, prerecorded video file 506 is positioned within display 502 so as to not obscure important visual elements of video 504 (e.g., the name of the business location, the logo of the business location, etc.)

FIG. 5B illustrates an example mobile electronic device 520 having a display 522. As illustrated, display 522 is displaying video 524, where video 524 depicts a scene of a blank wall in a city environment. In one embodiment, video 524 is a live video captured by a video capture device (e.g., a rear-facing camera) of mobile electronic device 520. It should be appreciated that in accordance with other embodiments, video 524 may be captured at another mobile electronic device, and transmitted to mobile electronic device 520 for rendering on display 522, either in real-time (e.g., live) or time delayed.

In one embodiment, video 524 is rendered via a camera application of mobile electronic device 520. In another embodiment, video 524 is rendered via an application of mobile electronic device 520 for superimposing a prerecorded video file over video 524. It should be appreciated that the superimposing of a prerecorded video file over a video may be performed at a standalone application of mobile electronic device 520 or via a plugin/modification of an existing application of mobile electronic device 520. In one embodiment, the superimposing of a prerecorded video file over video 524 is executed responsive to a user interaction with control element 528. Control element 528 is operable to activate/deactivate the superimposing of a prerecorded video file over video 524.

Mobile electronic device 520 also plays prerecorded video file 526 over video 524. Prerecorded video file 526, as illustrated, is a user-generated video file that conveys information desired by the creator. In the illustrated example, prerecorded video file 526 includes a depiction of an ocean scene. Prerecorded video file 526 enhances the experience of the user of mobile electronic device 520 by conveying a particular message to that user. The illustrated example allows a user to beautify selected types of surroundings (e.g., blank walls) with video enhancements (e.g., waves crashing). For example, a user of mobile electronic device 520 may subscribe to a feed via a social network that enhances features of scenes. It should be appreciated that in some embodiments, prerecorded video file 526 is positioned within display 522 so as to not obscure important visual elements of video 524 (e.g., the name of the business location, the logo of the business location, etc.)

FIG. 5C illustrates an example mobile electronic device 540 having a display 542. As illustrated, display 542 is displaying video 544, where video 544 depicts a scene of a blank wall in a city environment. In one embodiment, video 544 is a live video captured by a video capture device (e.g., a rear-facing camera) of mobile electronic device 540. It should be appreciated that in accordance with other embodiments, video 544 may be captured at another mobile electronic device, and transmitted to mobile electronic device 540 for rendering on display 542, either in real-time (e.g., live) or time delayed.

In one embodiment, video 544 is rendered via a camera application of mobile electronic device 540. In another embodiment, video 544 is rendered via an application of mobile electronic device 540 for superimposing a prerecorded video file over video 544. It should be appreciated that the superimposing of a prerecorded video file over a video may be performed at a standalone application of mobile electronic device 540 or via a plugin/modification of an existing application of mobile electronic device 540. In one embodiment, the superimposing of a prerecorded video file over video 544 is executed responsive to a user interaction with control element 548. Control element 548 is operable to activate/deactivate the superimposing of a prerecorded video file over video 544.

Mobile electronic device 540 also plays prerecorded video file 546 over video 544. Prerecorded video file 546, as illustrated, is a user-generated video file that conveys information desired by the creator. In the illustrated example, prerecorded video file 546 includes a depiction of computer-generated molten lava scene that overlays a sidewalk. Prerecorded video file 546 enhances the experience of the user of mobile electronic device 540 by conveying a particular message to that user. The illustrated example allows a user to visually transform selected types of surroundings (e.g., sidewalks, roads, pavement, etc.) with video enhancements (e.g., rushing water, molten lava, etc.). For example, a user of mobile electronic device 540 may subscribe to a feed via a social network that enhances features of scenes. It should be appreciated that in some embodiments, prerecorded video file 546 is positioned within display 542 so as to not obscure important visual elements of video 544 (e.g., the name of the business location, the logo of the business location, etc.)

Example Methods of Operation

Figure 6:
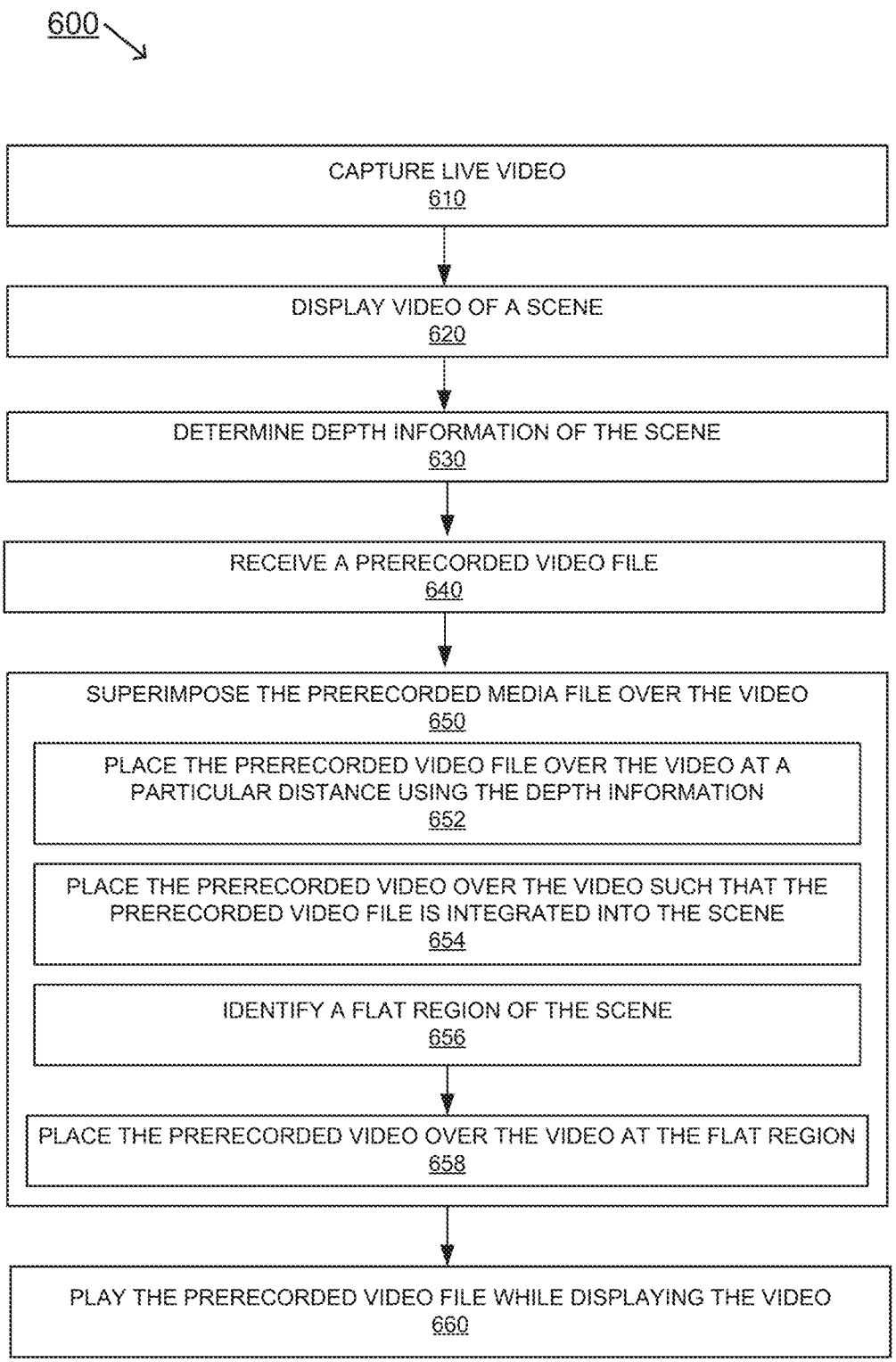
FIG. 6 illustrates a flow diagram of an example method for superimposing a prerecorded media file into a video, according to various embodiments.

FIG. 6 illustrates a flow diagram 600 of an example method for superimposing a prerecorded media file into a video, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in flow diagram 600 may be implemented in hardware, or a combination of hardware with firmware and/or software.

In one embodiment, as shown at procedure 610 of flow diagram 600, live video is captured at a video capture device (e.g., optical sensor 135) of a mobile electronic device (e.g., mobile electronic device 100). At procedure 620, a video of a scene is displayed on a display device (e.g., display 140) of the mobile electronic device. In one embodiment, the video is live video captured at procedure 610.

In some embodiments, as shown at procedure 630, depth information of the scene captured within the video is determined. The depth information defines distances of points of the scene from a video capture device, such that the depth information comprises relative depths of the points of the scene based on a position of the video capture device.

At procedure 640, a prerecorded video file to render on the display device is received. At procedure 650, the prerecorded video file is superimposed over the video, such that the video is partially obscured by the prerecorded video file. The prerecorded video file is played while displaying the video, such that the prerecorded video file and a non-obscured portion of the video are rendered simultaneously. In some embodiments, the prerecorded video file is selectable for interactivity, wherein a user interaction with the prerecorded video file initiates an action. (e.g., navigate to a particular website, show content, transform the prerecorded video file, etc.)

In one embodiment, as shown at procedure 652, the prerecorded video file is placed over the video at a particular distance from the position of the video capture device based on the depth information. In another embodiment, as shown at procedure 654, the prerecorded video file is placed over the video at the distances that the points of the scene are from the video capture device based on the depth information, such that the prerecorded video file is visually integrated into the scene. In one embodiment, the depth information includes surface contours of objects within the scene, such that the prerecorded video file is placed over the video following the surface contours of the objects. In another embodiment, as shown at procedure 656, a flat region of the scene within the video is identified based on the depth information. At procedure 658, the prerecorded video file is placed over the video at the flat region of the scene, such that the prerecorded video file is visually integrated into the scene at the flat region.

At procedure 660, the prerecorded video file is played while displaying the video, such that the prerecorded video file and a non-obscured portion of the video are rendered simultaneously.

Figure 7A:
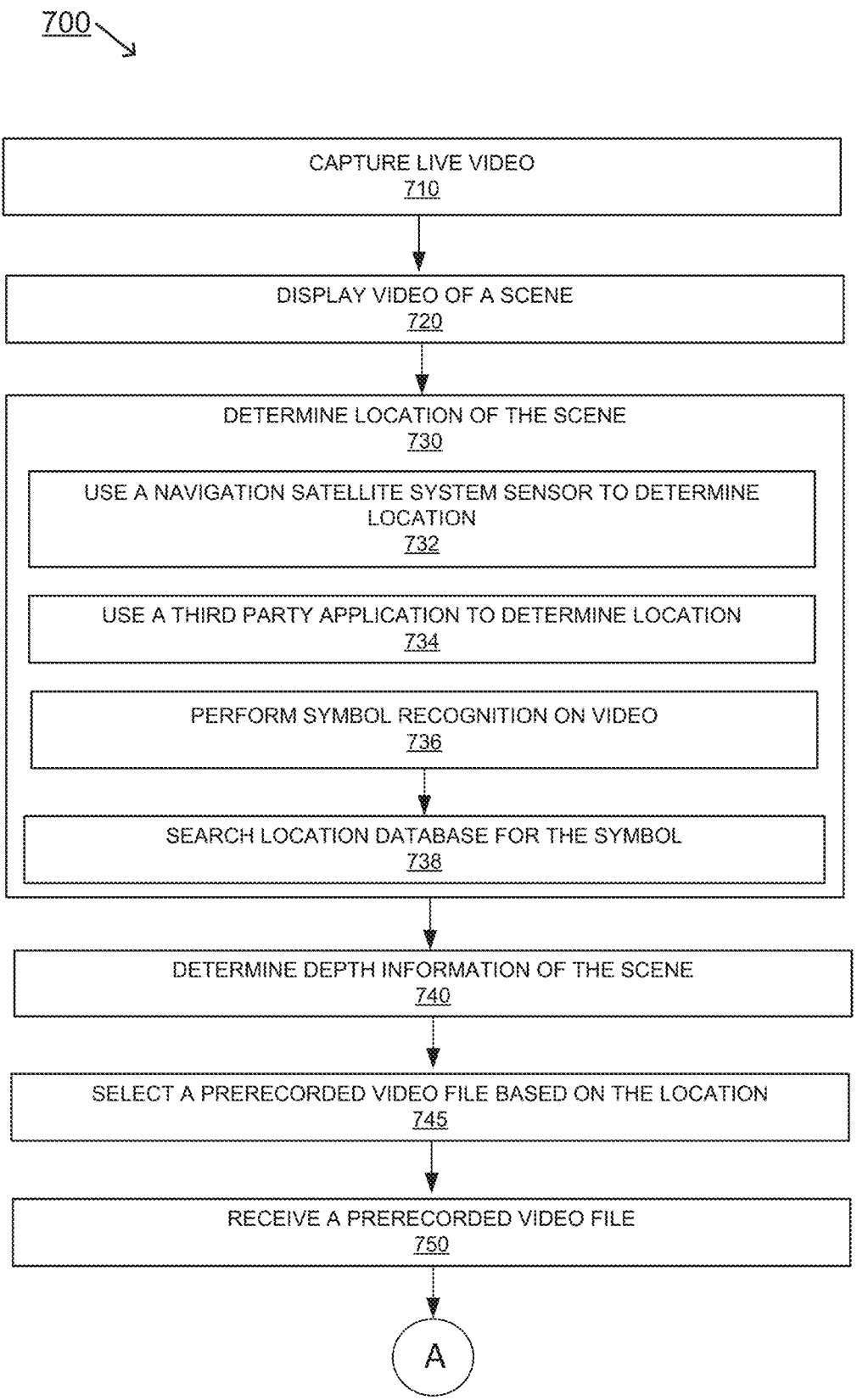

FIGS. 7A and 7B illustrate a flow diagram 700 of an example method for selecting of a prerecorded media file for superimposing into a video, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 700 includes some procedures that, in various embodiments, are carried out by one or more processors under the control of computer-readable and computer-executable instructions that are stored on non-transitory computer-readable storage media. It is further appreciated that one or more procedures described in flow diagram 700 may be implemented in hardware, or a combination of hardware with firmware and/or software.

With reference to FIG. 7A, in one embodiment, as shown at procedure 710 of flow diagram 700, live video is captured at a video capture device (e.g., optical sensor 135) of a mobile electronic device (e.g., mobile electronic device 100). At procedure 720, a video of a scene is displayed on a display device (e.g., display 140) of the mobile electronic device. In one embodiment, the video is live video captured at procedure 710.

At procedure 730, a location of the scene is determined. In one embodiment, as shown at procedure 732, the location of the scene is determined using a navigation satellite system sensor (e.g., location sensor 170) of the mobile electronic device. In another embodiment, as shown at procedure 734, the location of the scene is determined using a third party application (e.g., Foursquare, Yelp). In another embodiment, as shown at procedure 736, symbol recognition is performed on the video to identify at least one symbol (e.g., logo, word, phrase, etc.) At procedure 738, a location database is searched for the symbol to determine the location.

In some embodiments, as shown at procedure 740, depth information of the scene captured within the video is determined. The depth information defines distances of points of the scene from a video capture device, such that the depth information comprises relative depths of the points of the scene based on a position of the video capture device.

At procedure 745, a prerecorded video file to render on the display device is selected based on the location determined at procedure 730. At procedure 750, a prerecorded video file to render on the display device is received.

With reference to FIG. 7B, at procedure 760, the prerecorded video file is superimposed over the video, such that the video is partially obscured by the prerecorded video file. The prerecorded video file is played while displaying the video, such that the prerecorded video file and a non-obscured portion of the video are rendered simultaneously. In some embodiments, the prerecorded video file is selectable for interactivity, wherein a user interaction with the prerecorded video file initiates an action. (e.g., navigate to a particular website, show content, transform the prerecorded video file, etc.)

In one embodiment, as shown at procedure 762, the prerecorded video file is placed over the video at a particular distance from the position of the video capture device based on the depth information. In another embodiment, as shown at procedure 764, the prerecorded video file is placed over the video at the distances that the points of the scene are from the video capture device based on the depth information, such that the prerecorded video file is visually integrated into the scene. In one embodiment, the depth information includes surface contours of objects within the scene, such that the prerecorded video file is placed over the video following the surface contours of the objects. In another embodiment, as shown at procedure 766, a flat region of the scene within the video is identified based on the depth information. At procedure 768, the prerecorded video file is placed over the video at the flat region of the scene, such that the prerecorded video file is visually integrated into the scene at the flat region. In one embodiment, as shown at procedure 770, the prerecorded video file is placed over the video without obscuring the at least one symbol.

At procedure 780, the prerecorded video file is played while displaying the video, such that the prerecorded video file and a non-obscured portion of the video are rendered simultaneously.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for selecting of a prerecorded media file for superimposing into a video, the method comprising:
    displaying live video of a scene on a display device of a mobile electronic device;
    determining the location of the scene;
    selecting a prerecorded video file based at least in part on the location;
    determining depth information of the scene from the live video, wherein the depth information defines distances between points of the scene and a video capture device, such that the depth information comprises relative depths of the points of the scene from a position of the video capture device;
    identifying a flat region of the scene based on the depth information;
    superimposing the prerecorded video file over the live video, such that the live video is partially obscured by the prerecorded video file and such that the prerecorded video file is visually integrated in perspective into the scene at the flat region; and
    playing the prerecorded video file while displaying the live video, such that the prerecorded video file and a non-obscured portion of the live video are rendered simultaneously.

2. The method of claim 1, wherein determining the location of the scene comprises:
    performing symbol recognition on the live video to identify at least one symbol in the live video.

3. The method of claim 1, wherein determining the location of the scene comprises: using a navigation satellite system sensor of the mobile electronic device to determine the location.

4. The method of claim 1, further comprising:
    performing symbol recognition on the live video to identify at least one symbol; and
    searching a database for the at least one symbol.

5. The method of claim 4, wherein the at least one symbol comprises text or a logo corresponding to a business name and wherein the location is determined at least in part using the business name.

6. The method of claim 4, wherein the superimposing the prerecorded video file over the live video comprises:
    placing the prerecorded video file over the live video without obscuring the at least one symbol.

7. The method of claim 1, wherein the prerecorded video file is an advertisement related to the location.

8. The method of claim 1, wherein the prerecorded video file is a user-generated video file selected from a library of media files.

9. The method of claim 1, wherein the flat region comprises a signage region of a business.

10. The method of claim 1, wherein the prerecorded video file is selectable for interactivity and wherein a user interaction with the prerecorded video file initiates an action.

11. The method of claim 10, wherein the action comprises showing content related to the location.

12. The method of claim 11 wherein the content comprises a coupon or a website.

13. A non-transitory computer readable storage medium having computer readable program code stored thereon for causing a computer system to perform a method for selecting of a prerecorded media file for superimposing into a live video, the method comprising:
    capturing live video of a scene at a video capture device of a mobile electronic device,
    displaying live video of a scene on a display device of a mobile electronic device;
    determining the location of the scene;
    selecting a prerecorded video file based at least in part on the location;
    determining depth information of the scene from the live video, wherein the depth information defines distances between points of the scene and a video capture device, such that the depth information comprises relative depths of the points of the scene from a position of the video capture device;

identifying a flat region of the scene based on the depth information;

superimposing the prerecorded video file over the live video, such that the live video is partially obscured by the prerecorded video file and such that the prerecorded video file is visually integrated in perspective into the scene at the flat region; and playing the prerecorded video file while displaying the live video, such that the prerecorded video file and a non-obscured portion of the live video are rendered simultaneously.

14. The non-transitory computer readable storage medium of claim 13, wherein the method further comprises:

performing symbol recognition on the live video to identify at least one symbol; and searching a database for the at least one symbol.

15. The method of claim 14, wherein the at least one symbol comprises text or a logo corresponding to a business name and wherein the location is determined at least in part using the business name.

16. The method of claim 14, wherein the superimposing the prerecorded video file over the live video comprises:

placing the prerecorded video file over the live video without obscuring the at least one symbol.

17. The non-transitory computer readable storage medium of claim 13, wherein the flat region comprises a signage region of a business.

18. A mobile electronic device comprising:

a video capture device;

a display device;

a data storage unit; and a processor coupled with the data storage unit and the display device, the processor configured to:

capture live video of a scene at a video capture device of a mobile electronic device;

determine depth information of the scene captured within the live video, wherein the depth information defines distances between points of the scene and the video capture device, such that the depth information comprises relative depths of the points of the scene from a position of the video capture device;

identify a flat region of the scene based on the depth information;

display the live video on a display device of the mobile electronic device;

determine the location of the scene;

select a prerecorded video file based at least in part on the location;

superimpose the prerecorded video file over the live video based at least in part on the depth information, such that the live video is partially obscured by the prerecorded video file and such that the prerecorded video file is visually integrated in perspective into the scene at the flat region; and play the prerecorded video file while displaying the live video, such that the prerecorded video file and a non-obscured portion of the live video are rendered simultaneously.

19. The mobile electronic device of claim 18 wherein the flat region comprises a signage region of a business.

20. The mobile electronic device of claim 18 wherein processor is further configured to perform symbol recognition on the live video to identify at least one symbol corresponding to a business name, and wherein the location is determined at least in part using the business name.

* * * * *